United States Patent

[11] 3,576,351

| [72] | Inventor | David Collins<br>Clawson, Mich. |
|---|---|---|
| [21] | Appl. No. | 830,463 |
| [22] | Filed | June 4, 1969 |
| [45] | Patented | Apr. 27, 1971 |
| [73] | Assignee | North America Rockwell Corporation<br>Pittsburgh, Pa. |

[54] BRAKE CONTROL SYSTEM
7 Claims, 3 Drawing Figs.

[52] U.S. Cl..................................................... 303/21,
137/48, 137/599, 188/181
[51] Int. Cl........................................................ B60t 8/06,
B60t 8/12
[50] Field of Search........................................... 188/181;
303/21 (A)4, (BB), (F); 188/181; 137/81.5, 48,
599; 235/201, 150;

[56] References Cited
UNITED STATES PATENTS

| 3,245,213 | 4/1966 | Thompson et al. | 303/21(BB) |
|---|---|---|---|
| 3,245,727 | 4/1966 | Anderson et al. | 303/21(A4) |
| 3,369,845 | 2/1968 | Leonard | 303/21(F) |

*Primary Examiner*—Milton Buchler
*Assistant Examiner*—Stephen G. Kunln
*Attorneys*—John R. Bronaugh, Floyd S. Levison, E. Dennis O'Connor and Richard A. Speer

ABSTRACT: A fluidics control system for a vehicle brake system in which the normal operator-controlled braking effort is modulated in response to a condition of incipient or actual wheel lock to limit the braking effort to a level just below that which will cause the wheels to lock.

A fluidics system detects the incipient or actual wheel lock and generates a signal which reduces the braking effort at the slipping wheel or wheels to the desired level.

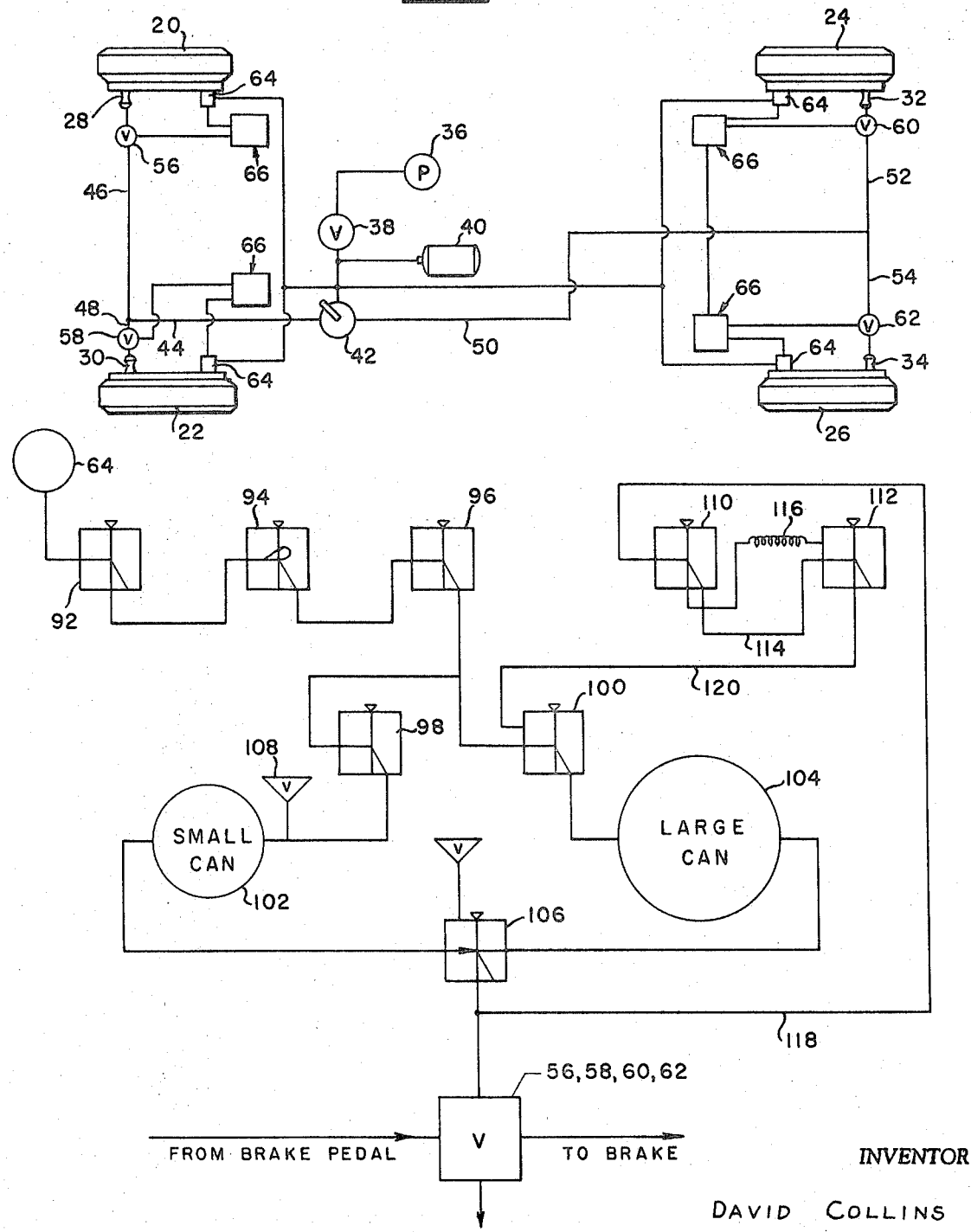

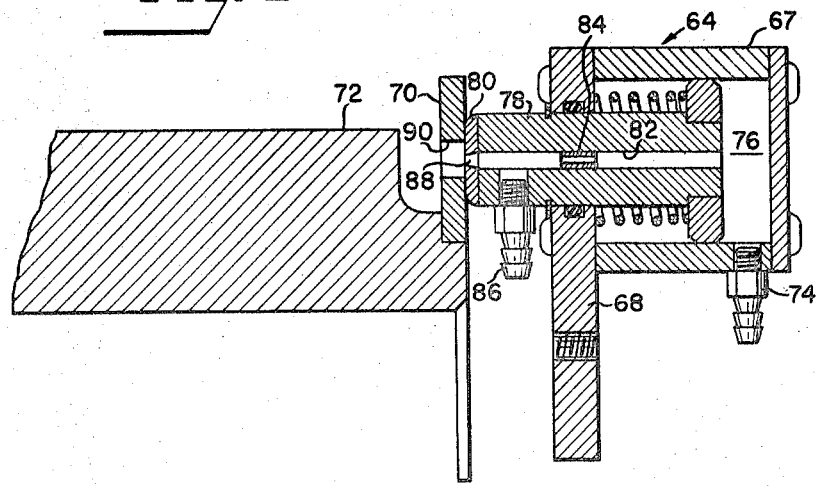
Fig. 3
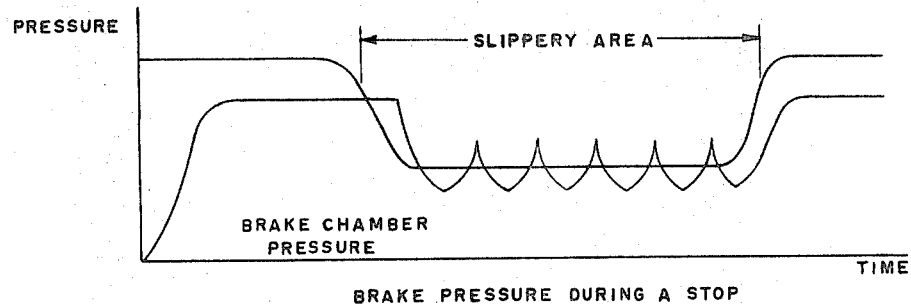
BRAKE PRESSURE DURING A STOP
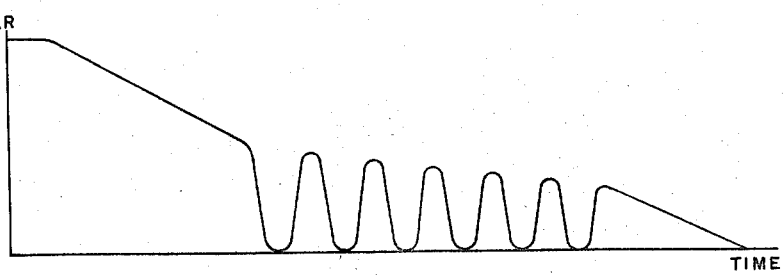
WHEEL ANGULAR VELOCITY
DURING THE SAME STOP
Fig. 5
INVENTOR
David Collins

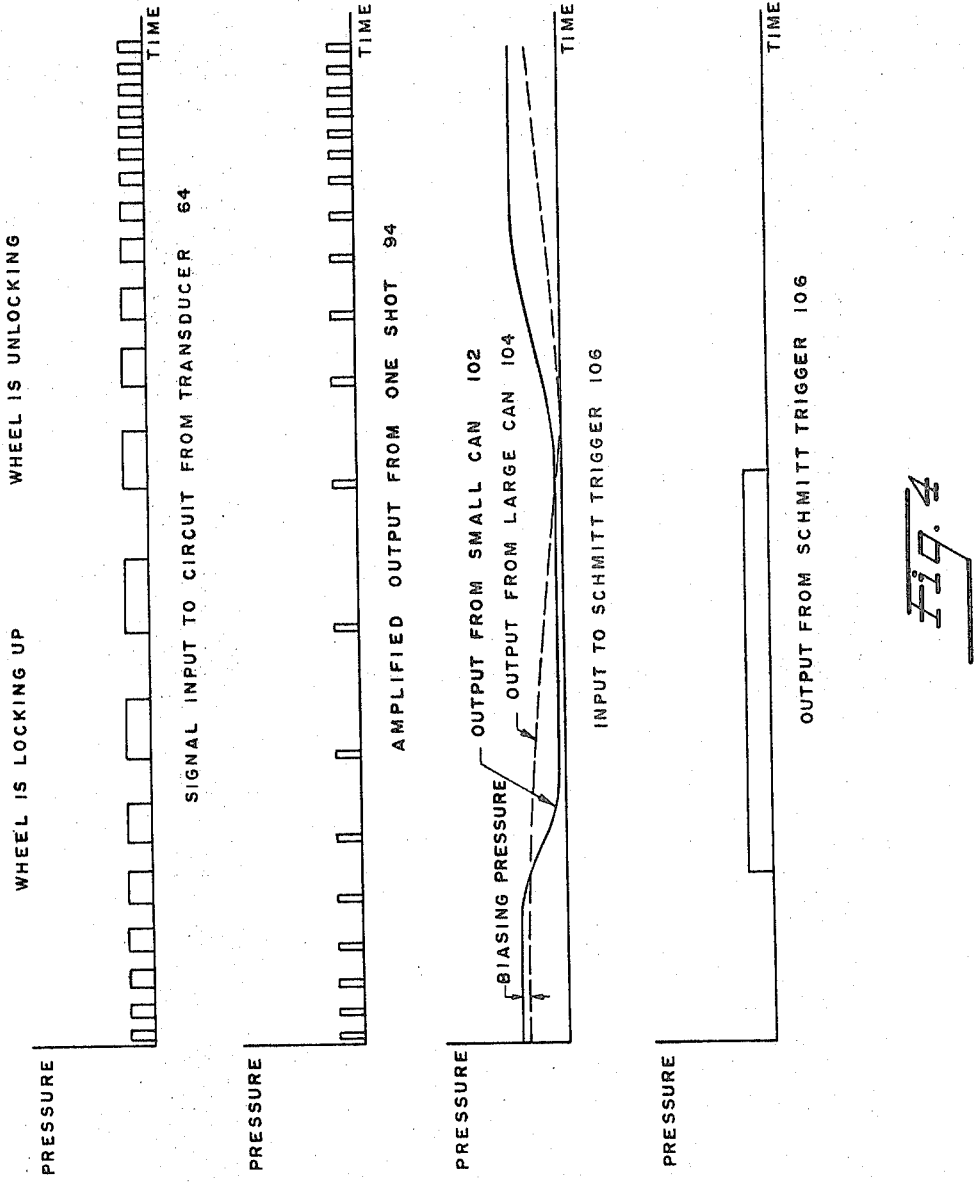

BRAKE CONTROL SYSTEM

RELATED APPLICATIONS

Related brake control systems are disclosed and claimed in copending application Ser. No. 667,004 filed Sept. 11, 1967, now U.S. Pat. No. 3,503,654 issued Mar. 31, 1970, for Brake System; Ser. No. 662,448 filed Aug. 22, 1967, now abandoned in view of continuation application Ser. No. 866,152 filed Oct. 10, 1969 also now abandoned in view of continuation application Ser. No. 41,765 filed June 4, 1970, for Brake System; Ser. No. 709,706 filed Mar. 1, 1968, now abandoned in view of continuation application Ser. No. 37,396 filed May 11, 1970, for Brake System and Ser. No. 755,076 filed Aug. 26, 1968 for Brake System each owned by applicant's assignee.

BACKGROUND OF THE INVENTION

The most effective braking of a vehicle is that which reduces the speed of the vehicle in a minimum distance without affecting the directional stability of the vehicle. As is now generally agreed, this result is achieved when the vehicle brakes are applied with a force sufficient to produce limited slipping of the wheels but which avoids actual wheel lock. Full wheel lock usually increases the stopping distance and invariably results in loss of directional control. Front wheel lock results in a complete loss of steering control while rear wheel lock usually produces a spin, or, in the case of a tractor-trailer combination, causes jackknifing.

All vehicles presently being made are equipped with brakes having sufficient capacity to lock the wheels when the brakes are fully applied. It is the tendency of most operators, even experienced drivers, to apply the brakes fully in an emergency or panic stop condition. The attainment of the ideal braking condition can be achieved only by the optimum partial application of the brakes which is beyond the skill of even the most expert driver particularly under emergency conditions.

Accordingly, many proposals have been advanced to provide automatic override controls, either to limit the braking effort to avoid wheel lock, or to reduce or eliminate the braking effort should wheel lock develop. Certain of the most effective of such prior proposals are disclosed in the aforesaid copending applications. Other prior proposals are disclosed in U.S. Pats. Nos. 2,025,889, 2,906,376, 2,914,359, 3,022,114, 3,034,836, 3,089,734, 3,130,805, 3,165,180, 3,235,036, 3,245,727, 3,260,555, 3,269,781 and Canadian Pat. No. 706,298.

In these systems the incipient or actual wheel lock condition is detected by an electronic system, a hydraulic system, or in an inertia responsive system, which responds either to deceleration of the vehicle or to the individual wheels. In some cases the speed of each wheel is constantly compared with an arbitrary reference. In others, the speed of one wheel or set of wheels is compared with the speed of other wheels or another set of wheels. While certain of these systems, particularly those disclosed in the aforesaid copending applications, produce the desired brake action, each has its limitations particularly in cost, weight, bulk or reliability.

SUMMARY OF THE INVENTION

The principal purpose and object of the present invention is the provision of improved brake control systems of the general type referred to above and more particularly the provision in such a braking system of an improved system for detecting the incipient or actual wheel lock and for generating a signal to modify the braking effort.

More specifically the present invention provides a fluidics system to perform these functions.

The advantages of the system of the present invention are numerous. As there are no moving parts and as the operating mechanisms are based purely on fluid mechanics with no special material property significant to function there is nothing to wear out or to burn out or otherwise deteriorate. This system is completely stable in a wide variety of environmental conditions. Accordingly, it may be expected that the system will have an extended trouble-free service life and possess an unusually high degree of reliability.

The fluidics system, comprising components which are operated by airflow, is particularly adapted to use on commercial vehicles equipped with airbrake systems. In such an installation it requires no additional power source.

It is also an important object of the present invention to provide improved brake control systems which have greater flexibility than prior systems and which provide for more precise control of the braking action of the individual wheels.

In accordance with the present invention a separate control system is provided for each wheel which is to be controlled. Usually, in a passenger vehicle, it will be desired to control the braking action only at the rear wheels and in this case a separate control system will be provided for each rear wheel, each control systems acting independently of the other. When the system is applied to a truck or tractor-trailer combination, the control system can be applied to any or all of the wheels as desired since the application of the system to the brake associated with a particular wheel will not affect the operation of the brakes at any other wheel.

Additional objects and advantages will become apparent as the description proceeds in connection with the accompanying drawings:

DESCRIPTION OF THE DRAWINGS

FIG. 1 is a diagrammatic illustration of the application of the present invention to a four-wheel vehicle;

FIG. 2 is a schematic illustration of the fluidics control system per se;

FIG. 3 is a central vertical section of a fluidics wheel speed detecting device, a component of the system of FIG. 2; and FIGS. 4 and 5 are charts showing typical performance of the brake control system of the present invention.

DESCRIPTION OF PREFERRED EMBODIMENT

For illustrative purposes the invention will be disclosed as applied to a four-wheel vehicle such as a passenger car or a small truck. It is to be understood, however, that the invention has equal application to other types of vehicles including various forms of tractor-trailer combinations. Since the operating media for the fluidics control system of the present invention is air, the system will be disclosed as applied to a vehicle equipped with a conventional airbrake system. This system may also be applied to a vehicle having conventional hydraulic brakes. In such a case, however, it will be necessary to provide a separate source of air under pressure such as a small engine-driven compressor.

Referring now more particularly to FIG. 1, the vehicle there disclosed has front wheels 20 and 22 and rear wheels 24 and 26 equipped with conventional airbrake mechanisms 28, 30, 32 and 34, respectively. The basic brake system is conventional and comprises an engine-driven compressor 36 which delivers compressed air through a check valve 38 to a reservoir 40 connected to the usual foot-operated treadle valve 42. When the valve 42 is operated, air under pressure is applied through a conduit 44 and branch conduits 46 and 48 to the front-wheel brake actuators 28 and 30. Simultaneously, air under pressure is applied through conduit 50 and branch conduits 52 and 54 to actuate the rear brake mechanism 32 and 34. Interposed in the respective branch lines 46, 48, 52 and 54 are control valves 56, 58, 60 and 62. Under normal moderate braking conditions the valves 56—62 have no effect on this system and the pressure delivered by the brake valve 42 is delivered without modification to the front and rear wheel brakes. As explained in detail below these valves are operated to reduce the pressure delivered to the respective wheel brakes when a condition of wheel lock or incipient wheel lock is detected by the control system of the present invention.

Preferably, the overall control system of the present invention comprises a number of separate and independent systems, each acting in response to a detected condition at the particular wheel to control the braking action at that wheel. Such an arrangement provides maximum flexibility in installation and achievement of optimum control action. In many cases it is contemplated that the control systems will be applied to only certain of the vehicle wheels. In a typical passenger car, for example, which has a forward weight bias, augmented during rapid deceleration, it may suffice to apply the control units only to the rear wheels.

The control systems are identical and each comprises a transducer 64, illustrated separately in FIG. 3, which generates the basic signal indicative of the speed of the wheel with which it is associated. The control systems also comprise a fluidics circuit indicated generally at 66, shown in detail in FIG. 2, which responds to the speed signal delivered by the transducer 64 to generate a pulse signal to operate the associated valve 56, 58, 60 or 62 when actual or incipient wheel lock is detected at one of the wheels.

Referring now more particularly to FIG. 3, the transducer there shown is but one of many forms which may be used. The transducer is housed in a casing 67 carried by a plate 68 secured to nonrotating axle structure to support the unit adjacent a ring 70 carried by the brake drum 72 for rotation therewith. Air under pressure, preferably from the brake system reservoir 40, is supplied through a fitting 74 to a chamber 76 formed about one end of a piston assembly 78 the opposite end of which is provided with an antifriction face 80 in sliding engagement with the ring 70. Air under pressure flows from the chamber 76 into a through bore 82 in the piston 78 past a flow restrictor 84 to an outlet fitting 86 connected to the control system 66. Air under pressure also passes through the port 88 at the outer end of the piston 78 whenever the port 88 is aligned with one of a series of circumferentially spaced openings 90 in the ring 70. When the port 88 is aligned with one of the openings 90 the pressure supplied to outlet fitting 86 is relatively low and when the port 88 is out of alignment with one of these openings the pressure at the fitting 86 is relatively high. In this fashion the transducer 64 generates a signal the frequency of which is proportional to the angular velocity of the adjacent wheel. Typically the number of openings 90 will be so selected that the maximum frequency of the signal will be less than 400/sec. The signal is delivered from the transducer to the fluidics control circuit illustrated in FIG. 2 to which detailed reference will now be made.

The pulse signal delivered by the transducer 64 is fed to a bistable valve 92 which converts the incoming signal which is generally of sinusoidal form to a signal of square form. The resulting square wave signal, which is of the same frequency as the incoming signal from the transducer, is fed to a one-shot 94 which abbreviates the input signal to a fixed length of time, for example 1 millisecond, regardless of the duration of the input signal from the gate 92. The square wave short duration signal produced by the one-shot is fed to a bistable valve 96 which is, in effect, an amplifier. The output of the bistable valve is supplied to a pair of bistable valves 98 and 100 which deliver identical but separate outputs. The output of the bistable valve 98 is delivered to a capacitor can 102 which, in effect, averages the signal delivered by the gate. Similarly, the output of the gate 100 is delivered to a capacitor can 104 which averages the output of the gate 100. The can 104 is considerably larger than the can 102. Accordingly, its response to a change in the signal produced by the input gate is considerably slower than that of the can 102. The cans 102 and 104 are connected to opposite sides of a Schmitt trigger 106, the output of which is in turn connected to actuate the valve 56, 58, 60 or 62. The output of the Schmitt trigger 106 is low except when the pressure in can 104 is greater than the pressure in can 102. To assure that the signal will remain low under steady state conditions or near steady state conditions, the pressure of can 102 is augmented by a source of auxiliary biasing pressure 108. Thus under steady state conditions or throughout the range of normal acceleration or deceleration, the output of the trigger 106 remains low and the valves 56—62 have no effect on the braking system. When, however, the pressure in can 104 exceeds the pressure in can 102, as augmented by the source 108, the output of the trigger 106 becomes high to operate one of the valves 56—62 to connect the associated brake to atmosphere. The valve is so arranged as to prevent release of pressure in the brake lines which are effectively isolated from the brake when the valve is moved to its active position.

The overall operation of the portion of the system thus far described will now be considered. Let it first be assumed that the vehicle is operated at a constant speed and that the system has become stabilized at this speed. Under these conditions the augmented pressure of the small can 102 will exceed the pressure of the large can 104 and the output of the trigger will be zero. As the speed of the vehicle changes the pressure in the cans 102 and 104 will vary accordingly. However the change in pressure in the large can will lag to a certain extent with respect to the change in pressure in the smaller can, i.e., the smaller can will average the signal produced by the transducer 64 more rapidly than the large can.

When the vehicle decelerates because of normal braking or other circumstances the pressure in both cans 102 and 104 will decrease, the rate of decrease of the pressure in the small can being more rapid than the rate of decrease of the pressure in the large can. Nevertheless during all normal deceleration including normal braking, the augmented pressure of the can 102 will be larger than the pressure of the can 104 and the output of the trigger 106 will continue to be zero.

If, however, the braking effort is sufficient to cause significant wheel slip either because of application of full braking pressure or because the vehicle wheel passes onto ice or another low-friction surface the pressure in the small can 102 will decay very rapidly allowing the pressure in the large can to become predominant, thus changing the output of the trigger 106 from low to high to actuate one of the valves 56—62. When this occurs the pressure in the brake cylinder of the effected wheel will immediately be released, thus permitting the wheel to resume normal speed. As the wheel spins up to its normal speed the cans 102 and 104 then become recharged and as the wheel reaches normal speed the augmented pressure of the small can 102 again predominates and the output of the trigger 106 will be changed to zero restoring the valve 56—62 to its normal position, reapplying the brakes. If reapplication of the brakes restores the excessive slip conditions the resulting rapid deceleration of the wheel will cause a repetition of the cycle just described.

The control system of FIG. 2 also includes an auxiliary circuit for accelerating the rate of recharge of the large can after the occurrence of each brake release signal to prevent the larger can from running out of air during a series of rapid cycles of the system. This auxiliary circuit comprises a pair of bistable valves 110 and 112 interconnected by a short line 114 and a long line 116, the two gates effectively constituting a one-shot of long period. The gate 110 is connected to the output side of the trigger 106 through a line 118 and the output of the gate system is connected to the gate 100 through a line 120.

Under steady state conditions the output of the line 118 and the output of the line 120 is zero. When a brake release signal is generated, the output of the trigger changes from low to high but the output of the gate 112 remains low. When the output of the trigger 106 changes from high to low the output of the gate 112 becomes high and remains high for a sufficient period of time to significantly recharge can 104.

The action of the system during actual or incipient wheel lock and subsequent brake release is graphically illustrated in FIGS. 4 and 5. The topmost portion of FIG. 4 illustrates the signal from the transducer 64 after it has passed through the gate 92. This signal is of constant amplitude but of varying width. The frequency of this signal is proportional to the wheel speed and is thus of decreasing frequency as the wheel is locking up and of increasing frequency as the wheel resumes normal speed. The amplified output signal from the one-shot 94 retains the frequency characteristic of the transducer output, but the signals are of constant amplitude and constant short duration. Thus the amplified output of the one-shot 94 provides a pure frequency response proportional to the wheel speed.

Under steady state conditions which appear at the left of FIG. 4, the biasing pressure from the unit 108 maintains the pressure of the small can 102 above the pressure of the large can 104. Accordingly, as indicated at the bottom portion of FIG. 4, the output of the trigger is low. As one of the wheels begins to lock up the pressure in the small can 102 decreases rapidly as shown by the chart whereas the decay of the pressure of the large can 104 is relatively slow. As soon as the output from the small can is equal to or slightly less than the output from the large can the output of the trigger becomes high, signaling a brake release. The output of the small can 102 continues to fall until it effectively becomes simply the biasing pressure. The output from the large can continues to fall until it becomes essentially zero. Theoretically, as soon as the output of the trigger 106 becomes high the brakes are released and the wheel begins to resume its normal speed. However, this system response, while very rapid, is not instantaneous and the wheel does not begin to resume its normal speed until the brake release signal has been on for a finite period of time. Accordingly, the pressure in can 104 continues to decay even after the brake release signal has been generated. As soon as the pressure in can 104 becomes less than the biasing pressure the output of the trigger 106 becomes zero, the brake release signal is discontinued, and the brakes are reapplied. Because of the time delay between the end of the brake release signal and the actual application of the brakes, the wheel continues to accelerate as shown in the right-hand portion of FIG. 4. The augmented output from the small can and the output from the large can rise rapidly, the latter being augmented by the action of the bistable valves 110 and 112 and the conditions illustrated at the left of FIG. 4 are again restored. If the incipient wheel lock condition persists the cycle will then be repeated.

Usually this will result in rapid cycling of the brake chamber pressure and the corresponding rapid cycling of the angular velocity of the affected wheel as illustrated in FIG. 5 which illustrates the braking action in a typical case where the vehicle passes from a high-traction surface across a low-traction surface and back onto a high-traction surface during heavy braking.

The rapid cycling or effective pulsing of the brake has proved to be extremely effective in maintaining minimum stopping distances without loss of directional control of the vehicle. The control system has unusually flexibility since there are no interconnections between wheels and the systems for each wheel are essentially independent. Accordingly, the system may be installed on a trailer even if the associated tractor is not equipped with the system or is equipped with a different brake control system.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. Brake control system for a vehicle having plurality of wheels and an operator-controlled brake associated with each wheel comprising, means associated with one wheel for generating a first signal, the frequency of which is proportional to the angular velocity of said wheel, first and second means for independently averaging said first signal and generating second and third signals indicative, respectively, of said averages, said first means being effective to average said signal more rapidly than said second means whereby upon a decrease in the frequency of said first signal in excess of predetermined rate a difference between said second and third signals is created, and means responsive to said difference to reduce the braking effort at said one wheel when the brakes are applied.

2. Brake control system for a vehicle having a plurality of wheels and an operator-controlled airbrake adapted to be connected to a source of air under pressure, one brake being associated with each wheel comprising, an air-operated transducer associated with at least one wheel, said transducer being connected to said source of air under pressure and being effective to generate an air pulse signal, the frequency of which is proportional to the angular velocity of said wheel, first and second air containers to which said first signal is delivered, said containers being of different size and being effective to average said first signal at different rates and generating, respectively, second and third signals indicative of said averages whereby upon a decrease in the frequency of said first signal in excess of a predetermined rate a differential between said second and third signals is generated, and means responsive to said differential to reduce the braking effort at said one wheel during brake application.

3. The brake control system according to claim 2 wherein said last-mentioned means includes a Schmitt trigger to which said second and third signals are delivered.

4. Brake control system for a vehicle having a plurality of wheels and an operator-controlled airbrake adapted to be connected to a source of air under pressure, one brake being associated with each wheel, comprising, an air-operated transducer associated with at least one wheel, said transducer being connected to said source of air under pressure and being effective to generate an air pulse signal, the frequency of which is proportional to the angular velocity of said wheel, first and second air containers to which said first signal is delivered, said containers being of different size and being effective to average said first signal at different rates and generating, respectively, second and third signals indicative of said averages whereby upon a rapid decrease in the frequency of said first signal, the relatively repaid decrease in the pressure in said smaller container establishes a differential between said second and third signals, means responsive to said differential to generate a control signal effective to reduce the braking effort at said one wheel during brake application to thereby increase the frequency of said first signal, the resulting relatively rapid increase in the pressure in said smaller container eliminating said differential and terminating said control signal, and means effective upon termination of said control signal to increase the pressure in said larger container.

5. A fluidics control system comprising first and second containers of different size, means for supplying a variable frequency air pulse signal to each container, the containers averaging said signals at different rates, a Schmitt trigger connected to compare the pressures in said containers and deliver an output signal whenever the pressure in said smaller container is less than the pressure in said larger container by a predetermined amount as a result of a rapid decrease in the frequency of said input signal, means responsive to said output signal to increase the frequency of said input signal to recharge the containers, the rate of recharge of said smaller container being more rapid than the rate of recharge of said larger container, said output signal being terminated when said smaller container is recharged to the level of said larger container, and means responsive to the termination of said output signal to augment the rate of recharge of said larger container.

6. A brake control system for a vehicle having a plurality of wheels and an operator-controlled brake associated with each wheel comprising, means associated with at least one wheel for generating a first frequency modulated fluid signal the instantaneous frequency of which is a function of the instantaneous angular velocity of said wheel, fluidic means responsive to a predetermined decrease in the frequency of said first fluid signal in excess of a predetermined norm to generate a control signal, and means responsive to said control signal to reduce the braking effort to said one wheel during brake application.

7. A brake control system for a vehicle having a plurality of wheels and an operator-controlled brake associated with each wheel comprising, first fluidic means associated with one wheel and effective when said brakes are applied to generate a first frequency modulated fluidic control signal when the deceleration of said one wheel exceeds a predetermined amount, means responsive to said first fluidic control signal to reduce the braking effort at said one wheel, second fluidic means associated with another wheel and effective when said brakes are applied to generate a second fluidic control signal when the deceleration of said other wheel exceeds a predetermined amount, and means responsive to said second fluidic control signal to reduce the braking effort at said other wheel.